April 24, 1962  D. R. ATCHISON  3,031,022
WEIGHING SCALES
Filed June 19, 1959  2 Sheets-Sheet 1

Daniel Richard Atchison,
Inventor.
Koenig and Pope,
Attorneys.

April 24, 1962  D. R. ATCHISON  3,031,022
WEIGHING SCALES
Filed June 19, 1959  2 Sheets-Sheet 2

Daniel Richard Atchison,
Inventor.
Koenig and Pope,
Attorneys.

United States Patent Office 3,031,022
Patented Apr. 24, 1962

3,031,022
WEIGHING SCALES
Daniel Richard Atchison, Affton, Mo., assignor to Margaret Quarles Kubiak, St. Louis, Mo.
Filed June 19, 1959, Ser. No. 821,605
2 Claims. (Cl. 177—230)

This invention relates to weighing scales, and with regard to certain more specific features to such scales for bottles and the like.

Among the several objects of the invention may be noted the provision of a reliable, compact weighing scale adapted for convenient use in maintaining an accurate inventory of liquids dispensed from bottles, as in taverns, drug stores or the like; the provision of a scale of the class described having convenient bottle guiding means associated with its platform, which means also forms a compact protective sleeve for the weighing mechanism; the provision of a motion-multiplying mechanism for a scale of this class designed to confine all parts within a small shape of a size approximating that of the cross section of a bottle to be weighed; and the provision of a scale of the class described which is convenient to assemble, adjust and disassemble and which may be economically produced in accurate form from comparatively simple stamped parts, many of which are duplicates of one another and adapted to be made from one die. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIG. 1 is a front elevation of the scale, the broken lines illustrating a bottle in place thereon;

Corresponding reference characters indicate corresponding parts throughout the several views of the drawings.

Figure 1:
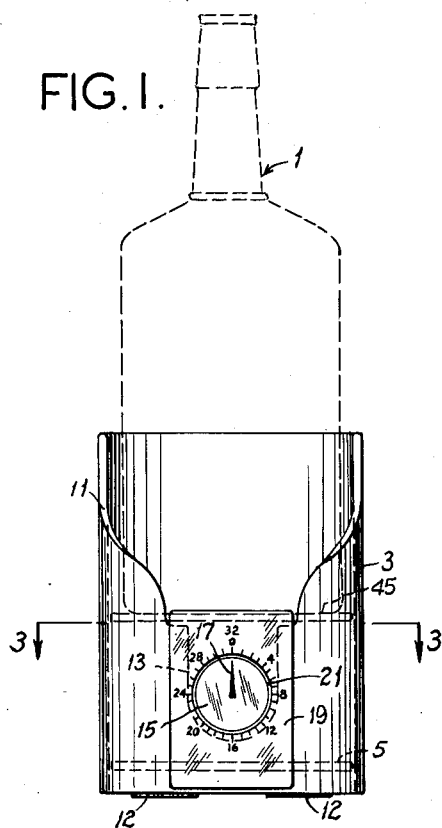
Figure 2:
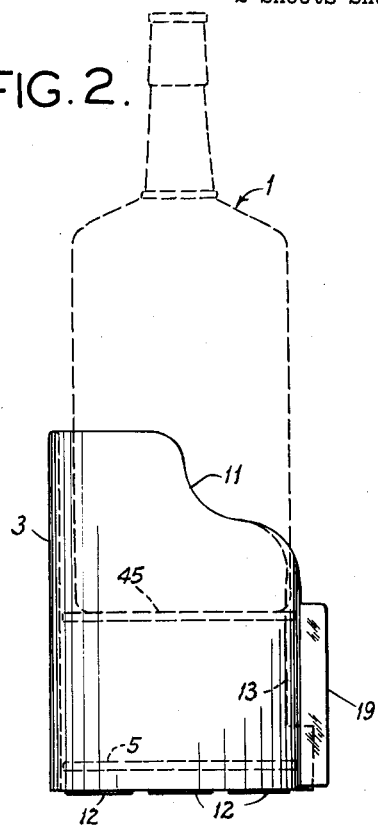
FIG. 2 is a left-side elevation of FIG. 1.
Figure 3:
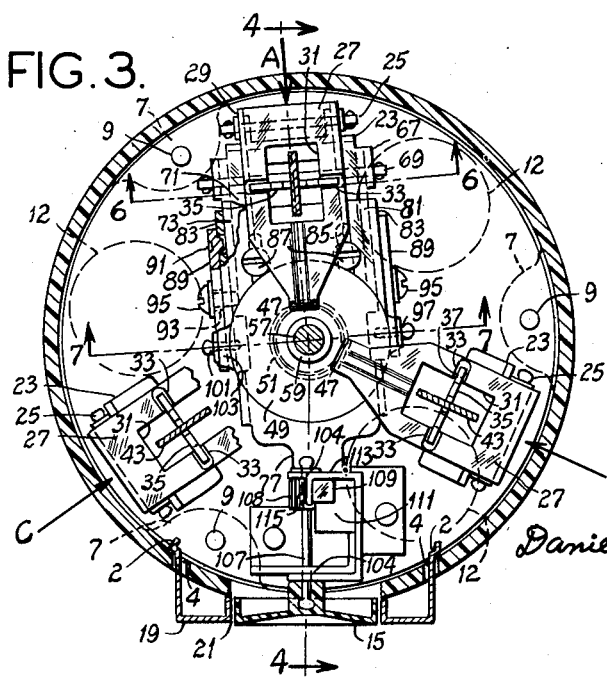
FIG. 3 is an enlarged cross section taken on line 3—3 of FIG. 1.
Figure 6:
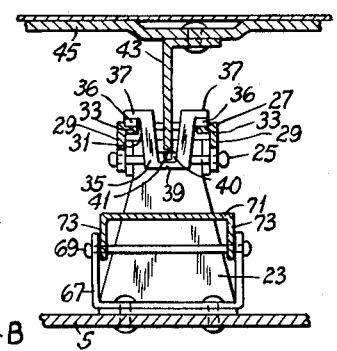
FIG. 6 is a fragmentary section taken on line 6—6 of FIG. 3.
Figure 4:
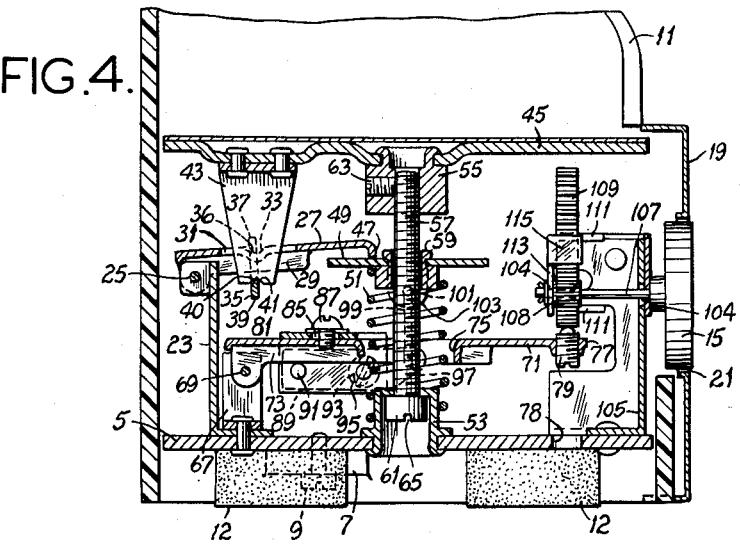
FIG. 4 is a fragmentary vertical section taken on line 4—4 of FIG. 3, without a bottle in place.
Figure 5:
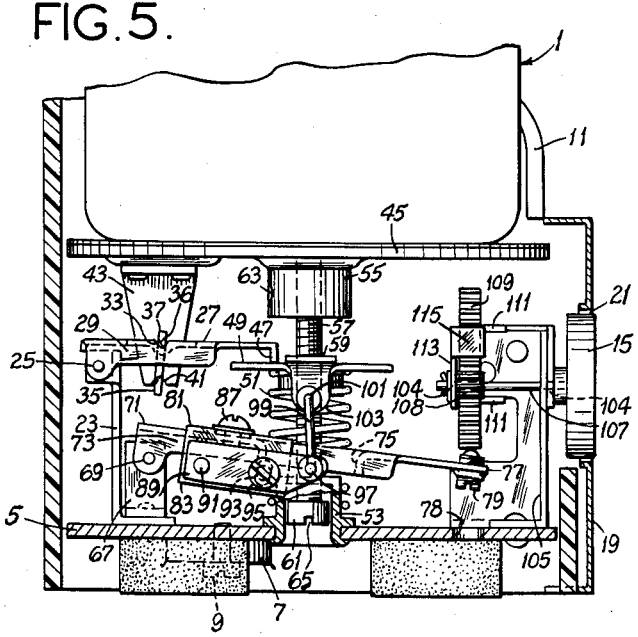
FIG. 5 is a view similar to FIG. 4 but showing a bottle in place.
Figure 7:
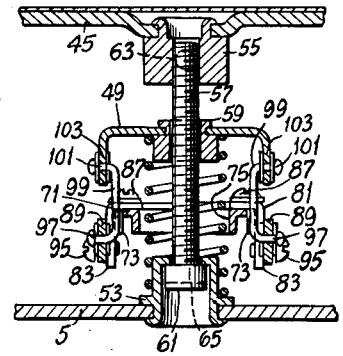
FIG. 7 is a fragmentary section taken on line 7—7 of FIG. 3.

Heretofore it has been difficult conveniently to maintain an inventory of liquid dispensed from bottled supplies of the same, as for example, bottled liquor in bars or the like. It is desirable to maintain such an inventory in terms of weight of liquor on hand in each bottle, which requires periodic determination of the volume of liquor that the bottle contains. Ordinary scales available for the purpose are of such a form as to be unsightly and a nuisance around a bar or the like. The smaller scales that might be used are not sufficiently rugged to withstand the attendant rough usage. Moreover, former scales have had no convenient means for rapid and safe interchange of bottles to be weighed.

By means of the present invention a very compact, rugged and convenient scale is provided which always indicates the contents of liquor in the bottle and from which the bottle can conveniently be removed for serving and thereafter replaced. It is of circular form, requiring not much more space on a counter than a bottle to be weighed.

Referring now more particularly to the drawings, numeral 1 indicates a conventional liquor bottle. At numeral 3 is shown a cylindrical sleeve, jacket or cowl of an inside diameter slightly larger than the diameter of the bottle 1 and adapted telescopically to receive it. The lower portions of this sleeve 3 surround the circular assembly of scale parts per se, to be described. The base of this circular assembly is shown at 5. This base or plate 5 rests upon and is attached to inwardly directed lug 7 of the sleeve 3 by means of screws 9. At numeral 12 are shown resilient pads spaced at equal intervals around the lower side of the supporting plate 5. These support the entire device.

The cowl 3 is cut away on one side in its upper portions, as shown at 11 in order to provide a side entry of the lower portion of the bottle to be inserted into the sleeve for subsequent downward telescoping movement. The cut-away portion 11 extends downward as shown at 13, to provide an opening for the reception and presentation of a wheel 15 having a pointer 17. Attached to the sleeve 3 and extending across the opening 13 is a dial plate 19, in which is an opening 21. The wheel 15 is located in this opening 21. Around the opening 21 are index characters indicating ounces of liquor or the like. Spring clips 2 in openings 4 hold the plate 19 in place.

Referring now to FIGS. 3-7, it will be seen that at aproximately 120° intervals around the base 5 are located three supports 23. Each support 23 at its upper end supports a pivot pin 25. All pins 25 are located at the same level. Pivoted on the pins 25 are motion-multiplying arms or beams 27, each of which is in the form of a flat plate, stiffened by side flanges 29 through which pass the pivot pins 25. The flat plate of each arm 27 includes an inner opening 31 between its flanges 29. Notches 33 are oppositely located in each arm plate 27 adjacent its respective opening 31 for the reception of transverse knife-edged ears 37 of U-shaped slings 35. Knife edges 36 are on the lower margins of the transversely extending ears 37. Thus each sling may rock on its ears 37 in the notches 33 and swing in its respective opening 31.

The inside of the bottom connection 39 of each sling 35 is also knife-edged on its upper margin, as shown at 40, for engagement with a notch 41 in the lower end of a tapering load plate 43. Each plate 43 and respective supporting sling 35 extend through a respective opening 31. Each load plate 43 is radially disposed and is riveted at its upper margin to a circular platform 45.

In view of the above it will be seen that the motion-multiplying arms 27 and the load plates 43 are radially disposed. At their inner ends the arms 27 are provided with downwardly directed fingers 47 which engage a central circular reaction plate 49. Plate 49 is biased upward by the upper end of a compression spring 51. The other end of the spring 51 is located around an inverted cup-shaped bushing 53 which is fastened in an opening in the circular supporting plate 5.

When a weight is placed upon the platform 45, the latter will tend to move downward along with the load plates 43. Each load plate carries one-third of the load. The plates 43 push down the slings 35, thereby rocking the arms 27 downward upon their pivots 25. The fingers 47 of these arms 27 thus push downward upon the plate 49 against the reaction of spring 51.

Upon the underside of the platform 45 is located a central bushing 55 for threaded reception of a threaded bolt 57 which extends downward loosely through an opening in a central bushing 59 in the reaction plate 49. The bolt 57 extends downward loosely through an opening in the upper end of the bushing 53, inside of which the bolt is provided with an enlarged head 61 which forms an upward limiting stop for the motion of platform 45.

In the upper bushing 55 there is a set screw 63. A screwdriver notch 65 in head 61 provides means for turning the bolt 57 when the set screw 63 is loose. The set screw 63 may be tightened to hold the bolt 57 in any adjusted position. The adjustable engagement of the head 61 of bolt 57 with the upper inner end of the bushing 53 also serves the purpose of pre-loading the spring 51 to a point where it will react with a force equal to the tare upon the platform 45. Tare in this case is taken to be the weight of an empty bottle.

In order to give a continuous indication of the liquid contents of the bottle, the following mechanism is employed:

As shown in FIGS. 3-6, one of the brackets 23 is provided with an additional bracket 67 for an additional pivot pin 69. At 71 is shown a motion-multiplying arm or beam which is sidewardly flanged as shown at 73, by means of which it is stiffened and carried on the pivot pin 69. This arm 71 extends from the pin 69 across and between plate 5 and 49. In order that arm 71 may clear the spring 51, it is provided for the purpose with a central opening 75. Beyond the opening, arm 71 has an extension 77 carrying an adjustable threaded set screw 79. This may be reached by a screwdriver insertable through an opening 78 in plate 5. Vertical swinging movement of the arm 71 is effected by connecting means with the reaction plate 49 as follows:

An inverted channel piece 81, having side flanges 83, rests on arm 71. The flanges 83 extend downward from the sides of the arm 71. In the upper surface of the channel 81 are elongate slots 85 for the reception of screws 87, adjustably holding the channel 81 to the upper surface of the arm 71. The slots permit sliding adjustment of the channel 81 along arm 71.

Attached to the side flanges 83 of channel 81 are extension arms 89. Each arm 89 is pivoted on its flange 83, as shown at 91, and is provided with a transverse slot 93 for the reception of a screw 95 which is threaded into the respective flange 83. Thus each arm 89 may be fastened on its respective flange 83 in any desired angular position within a range.

The purpose of the arms 89 is to provide endwise openings (on opposite sides of the spring 51) for the reception of pivoting ends 97 of drag links 99. Each drag link has an upper pivoting end 101 located in a lower opening of a downwardly extending ear 103 of the reaction plate 49. The ears 103 are also on opposite sides of the plate 49. Thus the drag links 99 flank the spring 51 and effect balanced thrusts on opposite sides of the reaction plate 49 and the extension pieces 89. When the reaction plate 49 moves up and down, the motion is transmitted to multiplying arm 71 which will swing up and down so as to move the set screw 79 up and down. The purpose of the adjustments provided for by the slots 85 and 93 is to obtain the most advantageous positional relationship between centers 69, 97 and 101 for optimum proportionality between movements of plate 49 and set screw 79.

In order to translate vertical movement of the set screw 79 into rotary movement of the index wheel 15, the following mechanism is provided:

An upright stamped bracket 105 is attached to the lower plate 5. This forms bearings 104 for a spindle 107. On the outer end of the spindle 107 and located in opening 21 is the pointer wheel 15. Spindle 107 also carries a pinion 108 which is meshed with a vertically movable rack 109. The rack is vertically slidable in guide means formed by ears 111, flange 113 and an ear 115 on the bracket 105. As the set screw 79 moves up and down, so does the rack 109, thus turning pinion 108 and pointer wheel 15. When the rack moves up, the pointer turns anticlockwise (FIG. 1). When the rack moves down, the point turns clockwise. The return movement of the rack 109 is effected by gravity on the rack 109.

The scale is originally prepared for operation as follows:

The bolt 57 is turned in a direction to draw down the platform 45 (and consequently fingers 47) sufficiently that the spring 51 is compressed to give a force reaction of platform 45 approximately equal to the tare weight of an empty bottle when located thereon. The pointer wheel 15 is located on its spindle so that the pointer 17 then points to 0 on the dial 19. Fine adjustment is effected at set screw 79. The adjustments are made for a given line of bottles 1 of closely equal weights. For substituted lines of different bottles, new adjustments may be made at 63 and 79.

In practice, the bottle whose contents is to be continually indicated sets upon the scale platform 45. Assume that a full quart bottle is placed upon the scale. Then the pointer 17 will point to 32, indicating a 32 ounce content. The tare weight of the empty bottle is not indicated. When a portion of the contents of the full bottle has been dispensed, usually one or two ounces at a time by removing the bottle from platform 45 and then replacing it, pointer 17 will indicate the number of ounces therein and the difference between 32 and such number indicates the contents which have been dispensed from the bottle. Thus an inventory may be made at any desired intervals of the amounts of liquor on hand. The bottle can be conveniently replaced on the platform 45 merely by moving its bottom transversely through the opening 11 of cowl 3 and then allowing it to be guided down onto the platform 45. Danger of knocking it over while on the platform is minimized. Removal of the bottle is equally easy. The small compact form of the scale is of advantage in that it takes up small space on or around the bar, said space being on the order of no more than the space occupied by a bottle.

While the circular form is preferable for round bottles, other shapes may be employed for bottles of other shapes, such as square. An important feature of the invention in this regard is that the scale mechanism is arranged compactly under the bottle being weighed, approximately within its outline in section. This saves storage space for the scale on a counter. The compactness is inherent in the fact that the mechanisms (23, 27, 35, 43) for transmitting motion from platform 45 to reaction plate 49 are plane-motion mechanisms, their planes of motions being angularly and radially disposed as suggested at A, B and C in FIG. 3. Moreover, the plane of motion of arm 71 and links 99 is in one of these planes (A in the present example) and the arm 71 extends across the line of movement of reaction plate 49. While mechanisms in three planes A, B, C are shown, other numbers may be used, preferably uneven, so that the end 77 of arm 71 and the rack or like driving mechanism for dial 19 may be located in the intervening space between two of the planes A, B, C.

It will be noted that arm 71 and link 99 constitute another plane-motion mechanism operative between the plate 49 and base 5. Its plane of motion is coextensive with that of one of the plane-motion mechanisms A, B, C (A in the present example).

While the cylindrical cowl 3 is shown as being of circular cross section, it will be understood that it, along with the base 5 and the platform 45, may be made of other than circular cross sections, and the term cylindrical herein as regards the cowl comprehends such other cross sections.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A scale comprising a base, a vertically movable load platform, a center post extending from the platform and axially adjustable relative thereto, said base having an opening through which the center post projects, a head on the post forming stop means engaging the base, a reaction plate having an opening for relative movement therethrough of said center post, a spring reactive between said base and said reaction plate biasing the plate upward an amount determined by said stop means, three fixed supports spaced peripherally around said reaction plate and providing pivots, inwardly projecting arms movable on said pivots and having inward means contacting said reaction plate, peripherally spaced supports under said load platform and supported by said arms respectively, a motion-transmitting link pivoted to one of said fixed supports, said link having an opening therein accommodating said post and the spring and extending to a free end thereof at a mid location between the other two spaced supports, motion-transmitting means connected between said link and said reaction plate, a substantially vertically movable rack at said mid location adapted to be moved by said free end of the link, and a spindle rotatable on a substantially horizontal axis above said free end of the link, said spindle carrying an index means and a pinion meshed with said rack.

2. A scale according to claim 1, including means on said link for adjusting said motion-transmitting means.

References Cited in the file of this patent

UNITED STATES PATENTS

| | | |
|---|---|---|
| 1,900,964 | Weber | Mar. 14, 1933 |
| 2,279,375 | Manning | Apr. 14, 1942 |

FOREIGN PATENTS

| | | |
|---|---|---|
| 515,038 | Belgium | Feb. 15, 1953 |